(12) United States Patent
Basheer et al.

(10) Patent No.: US 10,497,027 B2
(45) Date of Patent: *Dec. 3, 2019

(54) TRANSACTIONS WITH REWARD POINTS

(71) Applicant: American Express Travel Related Services Company, Inc., New York, NY (US)

(72) Inventors: Sibish Basheer, Phoenix, AZ (US); Nageshwara R. Chirravuri, Chandler, AZ (US); Sastry V S M Durvasula, Phoenix, AZ (US); Ravi Govindasamy, Phoenix, AZ (US); Priyadarshini Koul, Scottsdale, AZ (US); Ashish Kumar, Bangalore (IN); Premkumar Manivannan, Phoenix, AZ (US); Sathish B. Muthukrishnan, Phoenix, AZ (US); Varun Sood, Jessey City, NJ (US); Sohail Zafar, Scottsdale, AZ (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 94 days.

This patent is subject to a terminal disclaimer.

(21) Appl. No.: 15/904,749

(22) Filed: Feb. 26, 2018

(65) Prior Publication Data

US 2018/0181998 A1 Jun. 28, 2018

Related U.S. Application Data

(63) Continuation of application No. 14/307,229, filed on Jun. 17, 2014, now Pat. No. 9,934,517.

(51) Int. Cl.
*G06Q 30/02* (2012.01)
*G06Q 20/08* (2012.01)
(Continued)

(52) U.S. Cl.
CPC ........ *G06Q 30/0269* (2013.01); *G06Q 20/08* (2013.01); *G06Q 20/24* (2013.01);
(Continued)

(58) Field of Classification Search
CPC .......... G06Q 30/0269; G06Q 30/0226; G06Q 30/0281; G06Q 20/08; G06Q 20/24; G06Q 20/425
See application file for complete search history.

(56) References Cited

U.S. PATENT DOCUMENTS 5,819,291 A * 10/1998 Haimowitz .......... G06F 16/9014
5,884,272 A * 3/1999 Walker ............... G06Q 30/0615
379/93.12

(Continued)

OTHER PUBLICATIONS

USPTO; Non-Final Office Action dated Dec. 18, 2015 in U.S. Appl. No. 14/307,229.

(Continued)

*Primary Examiner* — Luis A Brown
*Assistant Examiner* — Robert C Johnson
(74) *Attorney, Agent, or Firm* — Thomas Horstemeyer, LLP (57) ABSTRACT

A method comprises receiving, by a computer-based system for processing a transaction, a notification that a transaction account holder has taken an action, taking, in near real time, an action in response to the action taken by the transaction account holder, and/or communicating with a web-client associated with the transaction account holder in response to the action taken by the transaction account holder. The communicating with the web-client may occur in near real time.

20 Claims, 3 Drawing Sheets

(51) Int. Cl.
*G06Q 20/24* (2012.01)
*G06Q 20/42* (2012.01)

(52) U.S. Cl.
CPC ....... *G06Q 20/425* (2013.01); *G06Q 30/0226* (2013.01); *G06Q 30/0281* (2013.01)

(56) References Cited

U.S. PATENT DOCUMENTS

| | | | | |
|---|---|---|---|---|
| 6,314,409 | B2* | 11/2001 | Schneck | G06F 21/10 705/54 |
| 8,972,287 | B1* | 3/2015 | Mesaros | G06Q 30/06 705/26.4 |
| 9,178,994 | B2* | 11/2015 | Tuchman | H04M 3/51 |
| 2001/0021915 | A1* | 9/2001 | Cohen | G06Q 30/02 705/14.35 |
| 2002/0010679 | A1* | 1/2002 | Felsher | G06F 19/328 705/51 |
| 2002/0174011 | A1* | 11/2002 | Sanchez | G06Q 20/387 705/14.25 |
| 2004/0243468 | A1* | 12/2004 | Cohagan | G06Q 30/02 705/14.23 |
| 2009/0152343 | A1* | 6/2009 | Carter | G06Q 10/0633 235/379 |
| 2009/0248599 | A1* | 10/2009 | Hueter | G06Q 10/00 706/20 |
| 2010/0280880 | A1* | 11/2010 | Faith | G06Q 10/06375 705/7.37 |
| 2012/0215610 | A1* | 8/2012 | Amaro | G06Q 30/02 705/14.23 |
| 2013/0030897 | A1* | 1/2013 | Aidasani | G06Q 20/40 705/14.23 |
| 2014/0351352 | A1* | 11/2014 | Degaugue | H04L 51/16 709/206 |
| 2015/0012442 | A1* | 1/2015 | Ceribelli | G06Q 20/1085 705/45 |

OTHER PUBLICATIONS

USPTO; Final Office Action dated Jun. 30, 2016 in U.S. Appl. No. 14/307,229.
USPTO; Advisory Action dated Sep. 20, 2016 in U.S. Appl. No. 14/307,229.
USPTO; Non-Final Office Action dated Aug. 25, 2017 in U.S. Appl. No. 14/307,229.
USPTO; Notice of Allowance dated Feb. 12, 2018 in U.S. Appl. No. 14/307,229.

* cited by examiner

TRANSACTIONS WITH REWARD POINTS

CROSS REFERENCE TO RELATED APPLICATIONS

This application is a continuation of, claims priority to and the benefit of, U.S. Ser. No. 14/307,229 filed Jun. 17, 2014 and entitled "SYSTEMS AND METHODS FOR PROCESSING TRANSACTIONS," which is incorporated herein in its entirety for all purposes.

FIELD

The present disclosure generally relates to providing near real time notifications in response to a variety of event triggers, and more particularly, to providing such notifications in response to event triggers performed by transaction account holders.

BACKGROUND

A transaction account holder may perform an action, such as swiping a transaction account instrument (e.g., a credit card) through a point of sale terminal ("POS"). The POS may read the transaction account instrument and communicate with a transaction account issuer (e.g., transaction account issuing bank in association with a card network) to authenticate and complete the requested transaction. However, because of the multiple parties involved, extra databases, processing and communications are needed. As such, conventional systems may not offer a near real time ability to perform an action, in response to the action taken by the transaction account holder (e.g., the instrument "swipe").

SUMMARY

A method comprises receiving a notification that a transaction account holder has taken an action, taking, in near real time, an action in response to the action taken by the transaction account holder, and/or communicating with a web-client associated with the transaction account holder, in response to the action taken by the transaction account holder. The communicating with the web-client may occur in near real time. The computer-based system may communicate a transaction balance to the web-client in response to the action taken by the transaction account holder. The computer-based system may transmit to a merchant, suggested services based upon a profile associated with the transaction account holder. The transaction account holder may be presented with an option to complete the transaction using rewards points. The transaction account holder may be presented with an option to complete the transaction using credit. The location of the transaction account may also be monitored. The location of the transaction account holder may be monitored to tailor services to the transaction account holder.

BRIEF DESCRIPTION OF THE DRAWINGS

The features and advantages of the present disclosure will become more apparent from the detailed description set forth below when taken in conjunction with the drawings, wherein like numbers represent like components.

DETAILED DESCRIPTION

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In general, the system delivers real-time outcomes driven by card spend. In various embodiments, the may use network-wide closed-loop capabilities. The system may incorporate, for example, information assets (e.g., closed-loop or open loop), data triggers (e.g., real-time), flexible business rules and integration APIs. The system may integrate with multiple capabilities across an enterprise system. The system may also include an offer ecosystem to deliver relevant, real-time events for an improved digital accountholder experience.

The system may integrate with, interpret and/or leverage the authorization transaction. The system's use of the authorization transaction may go beyond just providing an approved or denied response. The system may include real interactions with accountholders across various digital platforms such as, for example, Foursquare, Facebook, Twitter, PASS, and XBOX. In response to receiving the authorization trigger from an authorization system, the system may integrate in real-time with a synchronization platform, offer enrollment systems, merchant operational systems, merchant data enrichment capabilities (e.g., convert merchant code to name, address, and geo-coding for location), customer profiles and customer privacy. The system may then decide on the method of customer interaction (e.g., in-app push notification, email, text message) and trigger the real time event.

The system may support (e.g., in real time) in-app push notifications (e.g., Foursquare), emails (e.g., Facebook and XBOX), direct messages (e.g., tweets via Twitter), spend notifications (e.g., PASS to Passbook), digital offers, offer reminders and/or relevant offers. The system may connect across various internal platforms and capabilities and/or external partners (e.g., Foursquare, Facebook, Twitter, XBOX, Apple) to create an end-to-end flow and experience. The system may support use cases across multiple lines of business.

As used herein, the phrases "real time" and/or "near real time" may be used interchangeably and the like may mean any period of time after an action is taken by a transaction account holder. For example, a period of time from when a transaction request is received (e.g., via account code input or a "card swipe") and the time a communication is transmitted to a transaction account holder. In addition, these phrases may mean any duration of time during which a transaction is processed. In various embodiments, the period of time may include a period of picoseconds, nanoseconds, microseconds, milliseconds, seconds, minutes, hours, days, and the like.

Phrases and terms similar to "financial institution," "transaction account issuer" and "payment processor" may include any person, entity, software and/or hardware that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to a "buyer," "participant", "consumer," and "user" may include any person, entity, software and/or hardware that receives items (e.g., products, services, access, information, etc) in exchange for consideration (e.g. financial payment). For example, a buyer may purchase, lease, rent, barter or otherwise obtain items from a supplier and pay the supplier using a transaction account.

Phrases or terms similar to a "processor" (such as a payment processor) or "transaction account issuer" may include a company (e.g., a third party) appointed (e.g., by a merchant) to handle transactions for merchant banks. Processors may be broken down into two types: front-end and back-end. Front-end processors have connections to various transaction accounts and supply authorization and settlement services to the merchant banks' merchants. Back-end processors accept settlements from front-end processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

As used herein, "transmit" may include sending electronic data from one system component to another over a network connection. Additionally, as used herein, "data" may include encompassing information such as commands, queries, files, data for storage, and the like in digital or any other form.

Phrases or terms similar to "transaction account" may include any account that may be used to facilitate a financial transaction. A "transaction account" as used herein refers to an account associated with an open account or a closed account system (as described herein). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

In general, transaction accounts may be used for transactions between the user and merchant via any suitable communication means, such as, for example, a telephone network, intranet, the global public Internet, a point of interaction device (e.g., a point of sale (POS) device, personal digital assistant (PDA), mobile telephone, kiosk, etc.), online communications, off-line communications, wireless communications, and/or the like.

The terms "payment vehicle," "financial transaction instrument," "transaction instrument," or "transaction account product" may be used interchangeably throughout to refer to a financial instrument or to just an account code. As used herein, an account code may or may not be associated with a physical financial instrument.

An "account", "account code", or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, QR codes, Bluetooth, Near Field Communication, or a transponder and RFID reader in RF communication with the transponder (which may include a fob). Typical devices may include, for example, a key ring, tag, card, cell phone, wristwatch or any such form capable of being presented for interrogation.

Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account code may be distributed and stored in any form of plastic, electronic, magnetic, radio frequency, wireless, audio and/or optical device capable of transmitting or downloading data from itself to a second device. A customer account code may be, for example, a sixteen-digit transaction account code, although each transaction account provider has its own numbering system, such as the fifteen-digit numbering system used by American Express. Each company's transaction account codes comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the customer. A merchant account code may be, for example, any number or alpha-numeric characters that identify a particular merchant for purposes of card acceptance, account reconciliation, reporting, or the like.

It should be noted that the transfer of information in accordance with the present disclosure, may be completed in a format recognizable by a merchant system or account issuer. In that regard, by way of example, the information may be transmitted from a contactless (e.g., an RFID device)

to a contactless (e.g., RFID) reader or from the contactless reader to the merchant system in a variety of formats, e.g., magnetic stripe or multi-track magnetic stripe format.

Figure 1:
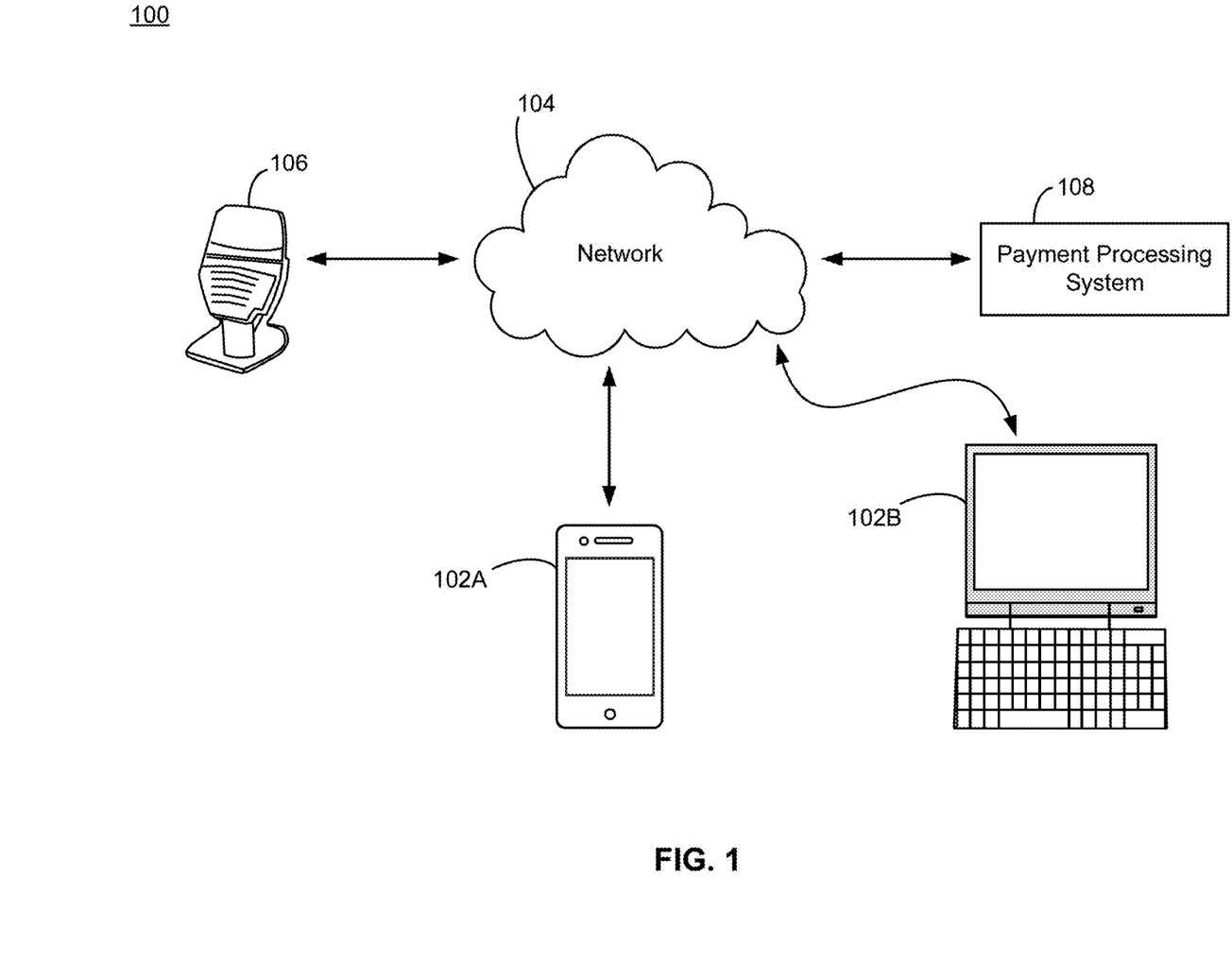
FIG. 1 illustrates, in accordance with various embodiments, a system for taking an action based on an action performed by a transaction account holder.

Referring to FIG. 1, a system 100 for taking an action based on an action performed by a transaction account holder is shown. The transaction account holder may include any transaction account beneficiary including a consumer having a shared account, a supplemental account, a child account, use of an account, receiving benefits of an account, etc. The system may comprise a web-client, such as a web-client 102a and/or 102b, a network 104, a POS 106, and/or a payment processor system 108. The payment processor system 108 may comprise any suitable hardware and/or software. For example, in various embodiments, the payment processor system 108 may comprise a multi-tier computer architecture such as a client-server architecture comprising one or more computers, computer servers, and/or the like.

In various embodiments, POS 106 may be coupled to the payment processor system 108 by a point-to-point connection, such as a frame relay connection. Thus, the POS 106 may communicate directly with the payment processor system 108.

A web-client 102a and/or 102b may include any device (e.g., personal computing device/mobile communication device) which communicates via any network. A web-client may be associated with and/or used by a consumer, a merchant, or both. A web-client 102a and/or 102b may include POS 106. A web-client may comprise a variety of browsing software or browser applications (e.g., Microsoft Internet Explorer, Mozilla Firefox, Google Chrome, Apple Safari, or any other of the myriad software packages available for browsing the internet). Such browser applications may comprise Internet browsing software installed within a computing unit or a system to conduct online transactions and/or communications. These computing units or systems may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Droid®, etc.) set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network 104.

As those skilled in the art will appreciate, a web-client may include an operating system (e.g., Windows NT, 95/98/2000/CE/Mobile, OS2, UNIX, Linux, Solaris, MacOS, PalmOS, etc.) as well as various conventional support software and drivers typically associated with computers. A web-client may implement security protocols such as Secure Sockets Layer (SSL) and Transport Layer Security (TLS). A web-client 102a and/or 102b may implement one or more application layer protocols, including, for example, http, https, ftp, and sftp. Transactions originating at a web-client may pass through a firewall (not shown; see below) in order to prevent unauthorized access from users of other networks.

Where a web-client 102a and/or 102b comprises a mobile device, the web-client 102a and/or 102b may include a software application (an "app") that enables the mobile device, irrespective of brand, to communicate with the payment processor portal 108.

A network 104 may comprise any electronic communications system or method which incorporates software and/or hardware components. Communication may be accomplished through any suitable communication channels, such as, for example, a telephone network, an extranet, an intranet, Internet, point of interaction device (point of sale device, personal digital assistant, smart phone, cellular phone (e.g., iPhone®, Palm Pilot®, Blackberry®), kiosk, etc.), online communications, satellite communications, offline communications, wireless communications, transponder communications, local area network (LAN), wide area network (WAN), virtual private network (VPN), networked or linked devices, keyboard, mouse and/or any suitable communication or data input modality. Moreover, although a network 104 may be described herein as being implemented with TCP/IP communications protocols, the network 104 may also be implemented using IPX, Appletalk, IP-6, NetBIOS, OSI, any tunneling protocol (e.g. IPsec, SSH), or any number of existing or future protocols. If the network 104 is in the nature of a public network, such as the Internet, it may be advantageous to presume the network 104 to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components described herein may be independently, separately or collectively coupled to the network 104 via one or more data links including, for example, a connection to an Internet Service Provider (ISP) over a local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network 104 may be implemented variously. For example, network 104 may be implemented as an interactive television (ITV) network. The systems and methods disclosed herein contemplate the use, sale and/or distribution of any goods, services or information over any network having functionality similar to that described above with reference to network 104.

Figure 2:
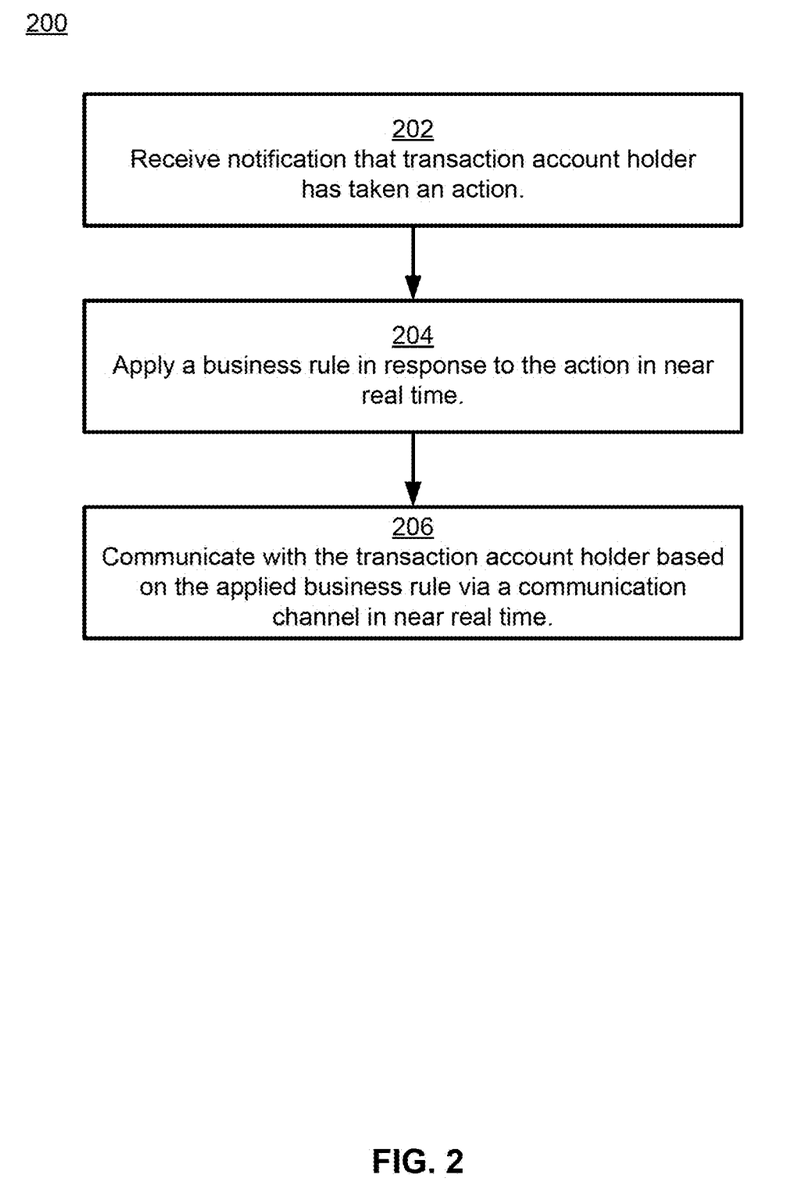
FIG. 2 illustrates, in accordance with various embodiments, a process for taking an action based on an action performed by a transaction account holder.

With reference now to FIG. 2, a process 200 for a payment processor taking an action based on an action performed by a transaction account holder is described. In various embodiments, the process 200 may comprise receiving a notification, by the payment processor system 108, that a transaction account holder (e.g., a customer) has taken an action (step 202).

The action taken by the transaction account holder may vary. For example, the action may comprise initiating a transaction request. The transaction request may be initiated by entering an account code, swiping a transaction instrument through a POS terminal and/or placing a transaction instrument having contactless payment functionality within range of a POS terminal having the similar capability. In addition, the action may comprise a post made by the transaction account holder to a FACEBOOK wall associated with the transaction account holder, communicating a "tweet" via TWITTER, checking in with a location based service (e.g., FOURSQUARE), and/or any of a variety of other similar actions which may be detected by or communicated to the payment processor system 108.

In various embodiments, the system includes a point-to-point connection with certain merchant system, so the merchant communications can be in near real time and information can be obtained in near real time. The point-to-point technology can be implemented using a frame relay system.

In response to receiving the notification of the transaction request, the payment processor system 108 may apply a business rule (as described herein) to the action taken by the transaction account holder in near real time (e.g., a matter of milliseconds) (step 204). For example, the payment processor system 108 may transmit, to web-client 102a and/or 102b, in response to receiving a transaction request (e.g., a card swipe at POS 106) a list of information that may be available for selection by the consumer. The payment processor system 108 may also transmit a record of the transaction request, a transaction account balance, a list of recent transactions, and/or any other transaction account information associated with the transaction account holder. The web-client 102a and/or 102b may display all or any portion of this information for review by the transaction account holder. This update and transmission to the web-client 102a and/or 102b may occur in near real time.

In addition, in various embodiments, the payment processor system 108 may, in response to a transaction request (e.g., a card swipe at a merchant location) determine whether the transaction account holder is a first time customer of the merchant or an existing customer of the merchant (e.g., a number of times the transaction account holder has visited the merchant). The payment processor system 108 may receive data, from the payment processor system 108 in near real time, about the transaction account holder, so that the merchant may tailor its products and/or services to the preferences of the transaction account holder.

Similarly, in various embodiments, the payment processor system 108 may, in near real time and in response to a transaction request (e.g., a card swipe), construct, develop, and/or add to a profile associated with the transaction account holder. For example, the payment processor system may construct, develop, and/or add to at least a portion of a profile based upon purchase data associated with the transaction request. The profile may include one or more profiles established by the payment processor, a company, a transaction account profile, a public profile (e.g., Facebook), a consumer created profile, a profile created from public or private databases, etc.

Such profile data may be anonymized such that personally identifying information (e.g., transaction account holder name) may be limited, restricted, scrubbed or removed from the profile. The profile may be provided to any of a variety of (merchant) systems which may use the anonymized profile data to communicate relevant content (e.g., offers, services, products, and the like) to transaction account holders.

In addition, in various embodiments, a transaction account holder may be eligible for a particular offer and/or may select (e.g., via the transaction account holder's web-client 102a and/or 102b) an offer for which the transaction account holder is eligible, as partially or fully determined by the payment processor system 108. The transaction account holder may redeem the offer by conducting another purchase by submitting another transaction request (e.g., a card swipe). The payment processor system 108 may, in response, transmit a notification or message to the web-client 102a and/or 102b that the offer has been redeemed in near real time. Likewise, the payment processor system 108 may notify the transaction account holder of the redemption.

Similarly, in various embodiments, a transaction account holder may submit a transaction request (e.g., a card swipe), and the payment processor system 108 may, in response, enable the web-client 102a and/or 102b to present the transaction account holder an option to conduct the transaction associated with the transaction request using rewards points, credits, and/or any combination thereof. This option may be presented in near real time following the transaction request. In addition, the rewards points may be immediately applied by the payment processor system 108 to the transaction account holder's transaction account (so that the transaction account holder only sees a rewards points debit on the transaction account holder's transaction account statement). The rewards points may also be applied at a later time to the transaction account holder's transaction account statement, so that the transaction account holder sees a debit and a subsequent credit on the statement associated with the transaction account holder's transaction account.

In various embodiments, a transaction account holder using a corporate transaction account may request a transaction (e.g., swipe a corporate card). In response, the payment processor 108 may send a notification or message to a corporation that employs or is otherwise associated with the transaction account holder and/or to a web-client 102a and/or 102b associated with the transaction account holder. This may occur in near real time following the transaction request.

Moreover, in various embodiments, the payment processor system 108 may monitor the location of the transaction account holder in near real time. This may be accomplished, for example, by identifying an association between a particular merchant location in response to a transaction request (e.g., a card swipe) made by a transaction account holder at the merchant location. Similarly, the payment processor system 108 may obtain a location of a transaction account holder from a cellular or mobile service provider enabled to triangulate and/or otherwise locate a transaction account holder, and/or a GPS receiver/transceiver located within the transaction account holder's web-client 102a and/or 102b. In response to the location of the transaction account holder, the payment processor system 108 may provide local offers to the transaction account holder and/or detect transaction account fraud, for example, where a location of a transaction request originates from a location different from the location of the web-client 102a and/or 102b (where the web-client comprises a mobile device), as described above.

Figure 3:
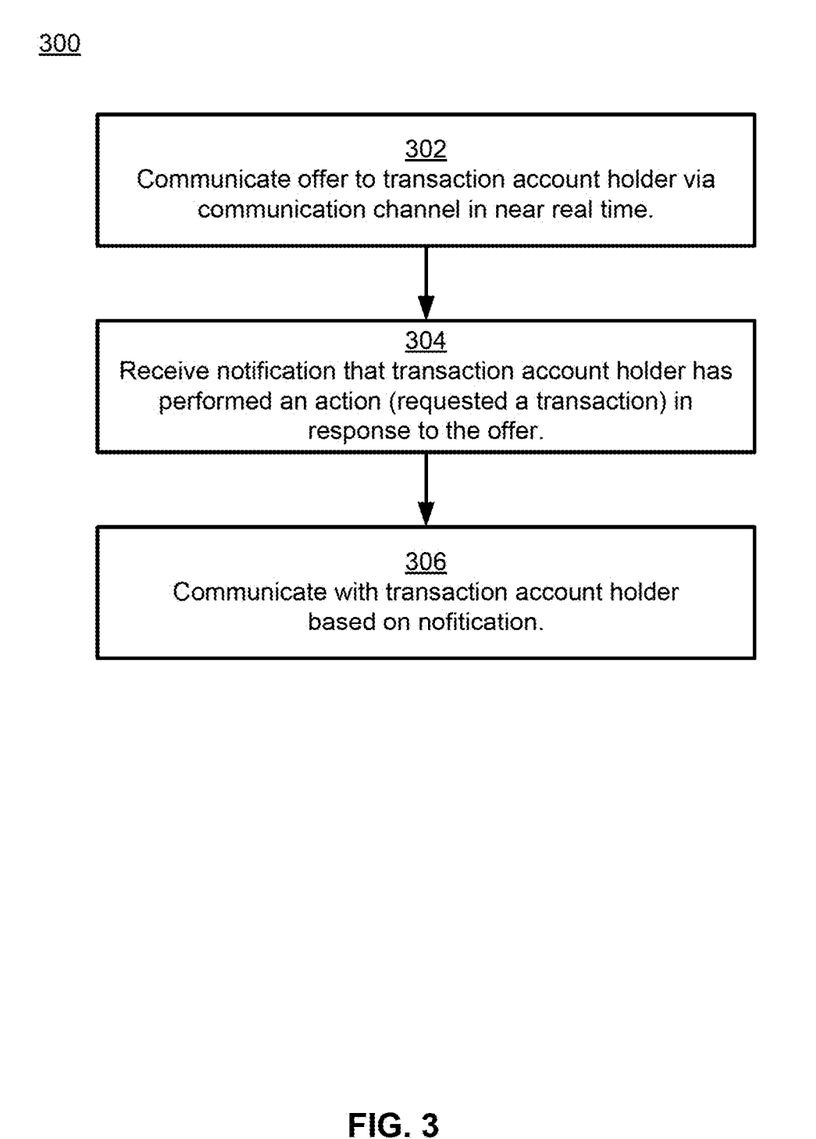
FIG. 3 illustrates, in accordance with various embodiments, a process for encouraging a transaction account holder to take an action.

With regard to FIG. 3, the payment processor system may communicate with a transaction account holder in near real time (step 302), even without receiving an action from the transaction account holder. For example, the payment processor system may communicate an offer to the transaction account holder, regardless of receiving anything from the transaction account holder. The offer may be communicated by the payment processor 108 to the transaction account holder in near real time. The payment processor system may receive a notification or message that the transaction account holder has performed an action related to the offer (e.g., requesting a transaction related to the offer), in response to the communication to the transaction account holder (step 304). For example, the transaction account holder may accept an offer in near real time. The payment processor may communicate in near real time with the transaction account holder that the offer has been accepted, in response to the notification that the transaction account holder has performed the action related to the offer, as described above (step 306).

Thus, in various embodiments, an action may be taken in near real time by the payment processor in response to an action taken by a transaction account consumer and/or payment processor 108 may encourage a transaction account holder to take an action (e.g., by transmitting an offer to the transaction account holder).

Any of the communications described above may be transmitted to a customer's web-client 102a and/or 102b, in near real time, as well as via any channel. The channel may include, for example, a software application installed on the customer's web-client 102a and/or 102b, or any other communication channel, such as email, text messaging, FACEBOOK, TWITTER, FOURSQUARE, and the like (step 206).

In the detailed description herein, references to "one embodiment", "an embodiment", "an example embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in certain embodiments.

In various embodiments, the methods described herein are implemented using the various particular machines described herein. The methods described herein may be implemented using the particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, 95/98/2000, XP, Vista, OS2, UNIX, Linux, Solaris, MacOS, etc.) as well as various conventional support software and drivers typically associated with computers. A user may include any individual, business, entity, government organization, software and/or hardware that interact with a system.

In an embodiment, various components, modules, and/or engines of system 100 may be implemented as microapplications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

A firewall may comprise any hardware and/or software suitably configured to protect system 100 components and/or enterprise computing resources from users of other networks. Further, a firewall may be configured to limit or restrict access to various systems and components behind the firewall for web-clients connecting through a web server. A firewall may reside in varying configurations including Stateful Inspection, Proxy based, access control lists, and Packet Filtering among others. A firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

Encryption may be performed by way of any of the techniques now available in the art or which may become available—e.g., Twofish, RSA, El Gamal, Schorr signature, DSA, PGP, PKI, and symmetric and asymmetric cryptosystems.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the inventions have been described as a method in certain embodiments, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A method comprising:
supplementing, by a computer, profile information of a transaction account holder based on an interaction with a social media channel and a transaction;

transmitting, by the computer and to a web-client associated with the transaction account holder, a list of information available for selection by the transaction account holder;

transmitting, by the computer and to the web-client, transaction information associated with the transaction account holder;

determining, by the computer and in response to the selection, that the transaction account holder is a first time customer of a merchant or an existing customer of the merchant;

determining, by the computer and in response to being the existing customer of the merchant, a number of times the transaction account holder visited the merchant;

supplementing, by the computer, the profile information of the transaction account holder with the transaction information, with the number of times the transaction account holder visited the merchant, and with social media profile information, wherein the supplementing is based on being the existing customer, the selection from the list of information and purchase data associated with the transaction account holder;

removing, by the computer, a subset of the profile information to create an anonymized profile;

providing, by the computer and in response to the removing, the anonymized profile to a merchant system of the merchant;

receiving, by the computer and from the merchant system and in response to the providing, a plurality of offers tailored to the transaction account holder based on the anonymized profile;

determining, by the computer and based on a business rule, a subset of the plurality of offers for which the transaction account holder is eligible;

transmitting, by the computer, the subset of the plurality of offers to the web-client of the transaction account holder;

receiving, by the computer and from the web-client, a selection of an offer from the subset of the plurality of offers; and applying, by the computer, the offer to at least a portion of the transaction.

2. The method of claim 1, further comprising taking, by the computer, a second action in response to the interaction taken by the transaction account holder.

3. The method of claim 1, further comprising communicating, by the computer and to the web-client, a transaction account balance, a record of a transaction request and a list of recent transactions, in response to the interaction taken by the transaction account holder.

4. The method of claim 1, further comprising transmitting, by the computer and to the merchant system, suggested services based upon the profile information associated with the transaction account holder.

5. The method of claim 1, further comprising supplementing, by the computer, the profile information based on the transaction account holder submitting an account number to the merchant system.

6. The method of claim 1, wherein the transmitting the offer to the web-client of the transaction account holder is via the social media channel.

7. The method of claim 1, wherein a location of the transaction account holder is monitored via at least one of transactions by the transaction account holder or triangulation based technology using the web-client of the transaction account holder.

8. The method of claim 1, further comprising tailoring, by the computer, the offer to be associated with a location of the transaction account holder.

9. The method of claim 1, further comprising receiving, by a computer, a trigger that the transaction account holder conducted the interaction with the social media channel.

10. The method of claim 1, further comprising notifying, by the computer and in response to receiving an authorization trigger, an employer of the transaction account holder about a use of a transaction account for the transaction.

11. The method of claim 1, wherein the transaction information includes at least one of a record of a transaction request for the purchase transaction, a transaction account balance, or a list of recent transactions.

12. The method of claim 1, further comprising:
receiving, by the computer, a redemption of the offer from the transaction account holder; and
transmitting, by the computer and to the web-client and in response to receiving the redemption, an option to conduct at least the portion of the transaction using reward points.

13. The method of claim 1, further comprising transmitting, by the computer, the offer to a corporation system associated with the transaction account holder.

14. The method of claim 1, wherein at least a portion of rewards points associated with the offer are applied at least one of to the transaction or as a credit on a statement.

15. The method of claim 1, further comprising supplementing, by the computer, the profile information with profiles established by at least one of the computer, a company, a transaction account profile, a public profile, a consumer created profile, a first profile created from a public database or a second profile created from a private database.

16. The method of claim 1, wherein communications between the computer and the merchant system uses point-to-point technology that is implemented using a frame relay system.

17. The method of claim 1, further comprising supplementing, by the computer, the interaction with a first action including at least one of a spend based trigger, a threshold based trigger, a frequency based trigger, a category based trigger or a social event trigger.

18. The method of claim 1, wherein the interaction includes at least one of a post to the social media channel or checking in with a location based service.

19. An article of manufacture including a non-transitory, tangible computer readable storage medium having instructions stored thereon that, in response to execution by a computer, cause the computer to perform operations comprising:

supplementing, by the computer, profile information of a transaction account holder based on an interaction with a social media channel and a transaction;

transmitting, by the computer and to a web-client associated with the transaction account holder, a list of information available for selection by the transaction account holder;

transmitting, by the computer and to the web-client, transaction information associated with the transaction account holder;

determining, by the computer and in response to the selection, that the transaction account holder is a first time customer of a merchant or an existing customer of the merchant;

determining, by the computer and in response to being the existing customer of the merchant, a number of times the transaction account holder visited the merchant;

supplementing, by the computer, the profile information of the transaction account holder with the transaction information, with the number of times the transaction account holder visited the merchant, and with social media profile information,
wherein the supplementing is based on being the existing customer, the selection from the list of information and purchase data associated with the transaction account holder;
removing, by the computer, a subset of the profile information to create an anonymized profile;
providing, by the computer and in response to the removing, the anonymized profile to a merchant system of the merchant;
receiving, by the computer and from the merchant system and in response to the providing, a plurality of offers tailored to the transaction account holder based on the anonymized profile;
determining, by the computer and based on a business rule, a subset of the plurality of offers for which the transaction account holder is eligible;
transmitting, by the computer, the subset of the plurality of offers to the web-client of the transaction account holder;
receiving, by the computer and from the web-client, a selection of an offer from the subset of the plurality of offers; and
applying, by the computer, the offer to at least a portion of the transaction.

20. A computer system comprising:
a tangible, non-transitory memory communicating with a processor,
the tangible, non-transitory memory having instructions stored thereon that, in response to execution by the processor, cause the processor to perform operations;
supplementing, by the processor, profile information of a transaction account holder based on an interaction with a social media channel and a transaction;
transmitting, by the processor and to a web-client associated with the transaction account holder, a list of information available for selection by the transaction account holder;
transmitting, by the processor and to the web-client, transaction information associated with the transaction account holder;
determining, by the processor and in response to the selection, that the transaction account holder is a first time customer of a merchant or an existing customer of the merchant;
determining, by the processor and in response to being the existing customer of the merchant, a number of times the transaction account holder visited the merchant;
supplementing, by the processor, the profile information of the transaction account holder with the transaction information, with the number of times the transaction account holder visited the merchant, and with social media profile information,
wherein the supplementing is based on being the existing customer, the selection from the list of information and purchase data associated with the transaction account holder;
removing, by the processor, a subset of the profile information to create an anonymized profile;
providing, by the processor and in response to the removing, the anonymized profile to a merchant system of the merchant;
receiving, by the processor and from the merchant system and in response to the providing, a plurality of offers tailored to the transaction account holder based on the anonymized profile;
determining, by the processor and based on a business rule, a subset of the plurality of offers for which the transaction account holder is eligible;
transmitting, by the processor, the subset of the plurality of offers to the web-client of the transaction account holder;
receiving, by the processor and from the web-client, a selection of an offer from the subset of the plurality of offers; and
applying, by the processor, the offer to at least a portion of the transaction.

* * * * *